US008798036B2

(12) United States Patent
Kūt et al.

(10) Patent No.: US 8,798,036 B2
(45) Date of Patent: Aug. 5, 2014

(54) COMMUNICATION SYSTEM AND METHOD

(75) Inventors: Andres Kūt, Tallinn (EE); Margus Sarapuu, Tallinn (EE)

(73) Assignee: Skype, Dublin (IE)

( * ) Notice: Subject to any disclaimer, the term of this patent is extended or adjusted under 35 U.S.C. 154(b) by 1164 days.

(21) Appl. No.: 11/986,018

(22) Filed: Nov. 19, 2007

(65) Prior Publication Data

US 2008/0159271 A1 Jul. 3, 2008

(30) Foreign Application Priority Data

Nov. 20, 2006 (GB) .................................. 0623103.9

(51) Int. Cl.
*H04L 12/66* (2006.01)
*H04M 3/42* (2006.01)

(52) U.S. Cl.
USPC .................. 370/352; 379/211.02; 379/211.03; 379/211.04

(58) Field of Classification Search
CPC . H04L 12/581; H04L 12/66; H04L 29/12018; H04L 51/04; H04L 61/10; H04L 63/0421; H04L 65/1063; H04L 65/1069; H04M 3/465; H04M 3/42008; H04M 2203/2072; H04M 7/003
USPC ............ 370/352–356; 379/211.02–3, 265.02, 379/265.11, 265.14
See application file for complete search history.

(56) References Cited

U.S. PATENT DOCUMENTS 6,061,363 A 5/2000 Evans et al.
6,718,028 B2 4/2004 Culli et al.

(Continued)

FOREIGN PATENT DOCUMENTS

EP 0695059 1/1996
EP 1126676 A2 8/2001

(Continued)

OTHER PUBLICATIONS

"Advisory Action", U.S. Appl. No. 11/986,835, (Sep. 15, 2011), 3 pages.

(Continued)

*Primary Examiner* — Asad Nawaz
*Assistant Examiner* — Joel Hamel
(74) *Attorney, Agent, or Firm* — Sonia Cooper; Jim Ross; Micky Minhas

(57) ABSTRACT

A method of establishing communication between a first and second user over a communications network, the second user being associated with contact information for at least one destination node. The method comprises allocating the contact information for the at least one destination node an identity from a set of available identities and displaying a hyperlink containing the identity on a display, wherein the hyperlink does not contain the contact information of the second user. The method also comprises the first user viewing the display using a terminal connected to the communications network and activating the hyperlink, and responsive to activating the hyperlink, transmitting from a client executed on the terminal a message to initiate communication, the message comprising the identity. The method further comprises, responsive to receiving the message at a network node, the network node translating the identity to the contact information for the at least one destination node, and the network node selecting one or more destination nodes from the at least one destination node and establishing a connection over the communications network between the client and the selected one or more destination nodes using the contact information.

20 Claims, 11 Drawing Sheets

(56) References Cited

U.S. PATENT DOCUMENTS

| | | | |
|---|---|---|---|
| 6,765,921 | B1 | 7/2004 | Stacey et al. |
| 7,003,079 | B1 * | 2/2006 | McCarthy et al. ......... 379/32.01 |
| 7,177,837 | B2 | 2/2007 | Pegaz-Paquet et al. |
| 7,207,008 | B1 * | 4/2007 | Koch ........................... 715/736 |
| 7,298,714 | B2 | 11/2007 | Foster |
| 7,298,814 | B2 | 11/2007 | Popescu |
| 7,403,517 | B2 | 7/2008 | Westman |
| 7,454,201 | B2 | 11/2008 | Brooking et al. |
| 7,548,536 | B1 * | 6/2009 | Alexander et al. ............ 370/352 |
| 7,565,436 | B2 | 7/2009 | Rabie |
| 7,675,881 | B2 | 3/2010 | Verma |
| 7,735,126 | B2 | 6/2010 | Zhang et al. |
| 7,756,548 | B2 | 7/2010 | Laroia et al. |
| 8,014,511 | B2 | 9/2011 | Kaal et al. |
| 8,170,563 | B2 | 5/2012 | Kaal |
| 8,175,091 | B2 | 5/2012 | Kaal |
| 8,711,841 | B2 | 4/2014 | Oruaas |
| 2002/0032631 | A1 | 3/2002 | Rose |
| 2002/0071424 | A1 | 6/2002 | Chiu et al. |
| 2002/0071539 | A1 | 6/2002 | Diament et al. |
| 2002/0103998 | A1 | 8/2002 | Debruine |
| 2002/0116464 | A1 | 8/2002 | Mak |
| 2002/0137500 | A1 | 9/2002 | Brooking et al. |
| 2002/0143855 | A1 | 10/2002 | Traversat et al. |
| 2003/0002485 | A1 | 1/2003 | Emerson et al. |
| 2003/0105812 | A1 | 6/2003 | Flowers, Jr. et al. |
| 2003/0112823 | A1 | 6/2003 | Collins et al. |
| 2003/0130008 | A1 | 7/2003 | Rajaniemi et al. |
| 2003/0224781 | A1 | 12/2003 | Milford et al. |
| 2003/0227902 | A1 | 12/2003 | Lindquist |
| 2005/0005030 | A1 | 1/2005 | Asai |
| 2005/0074102 | A1 | 4/2005 | Altberg et al. |
| 2005/0117735 | A1 * | 6/2005 | Seidman ................... 379/265.02 |
| 2005/0141509 | A1 | 6/2005 | Rabie et al. |
| 2005/0144327 | A1 | 6/2005 | Rabie et al. |
| 2005/0176410 | A1 | 8/2005 | Brooking et al. |
| 2005/0286519 | A1 | 12/2005 | Ravikumar et al. |
| 2006/0072547 | A1 | 4/2006 | Florkey et al. |
| 2006/0072726 | A1 * | 4/2006 | Klein et al. ............. 379/201.01 |
| 2006/0077971 | A1 | 4/2006 | Fowler |
| 2006/0227959 | A1 | 10/2006 | Mitchell |
| 2006/0229101 | A1 | 10/2006 | LaBauve et al. |
| 2006/0258289 | A1 | 11/2006 | Dua |
| 2007/0019623 | A1 | 1/2007 | Alt et al. |
| 2007/0066273 | A1 | 3/2007 | Laroia et al. |
| 2007/0117548 | A1 | 5/2007 | Fernandez-Alonso et al. |
| 2007/0124290 | A1 * | 5/2007 | Swanson et al. ................... 707/3 |
| 2007/0238472 | A1 | 10/2007 | Wanless |
| 2008/0045186 | A1 | 2/2008 | Black et al. |
| 2008/0137829 | A1 | 6/2008 | Kaal et al. |
| 2008/0137834 | A1 | 6/2008 | Kaal et al. |
| 2008/0139208 | A1 | 6/2008 | Kaal |
| 2008/0144578 | A1 | 6/2008 | Kaal |
| 2008/0152108 | A1 | 6/2008 | Kaal et al. |
| 2008/0165790 | A1 | 7/2008 | Kaal |
| 2008/0192734 | A1 | 8/2008 | Oruaas et al. |
| 2008/0205308 | A1 | 8/2008 | Prehofer et al. |
| 2012/0033797 | A1 | 2/2012 | Kaal et al. |

FOREIGN PATENT DOCUMENTS

| | | |
|---|---|---|
| EP | 1333637 A1 | 8/2003 |
| EP | 1408704 A1 | 4/2004 |
| EP | 1515506 | 3/2005 |
| EP | 1643740 | 4/2006 |
| EP | 1690165 | 8/2006 |
| GB | 2398458 | 8/2004 |
| GB | 2405285 | 2/2005 |
| GB | 2443889 | 5/2008 |
| GB | 2445065 | 6/2011 |
| WO | WO-9967922 | 12/1999 |
| WO | WO-0051331 | 8/2000 |
| WO | WO-0124478 | 4/2001 |
| WO | WO-0139469 | 5/2001 |
| WO | WO 01/41412 A2 | 6/2001 |
| WO | WO-02076049 | 9/2002 |
| WO | WO-02078268 | 10/2002 |
| WO | WO-03003678 | 1/2003 |
| WO | WO 2005/009019 | 1/2005 |
| WO | WO-2005084128 | 9/2005 |
| WO | WO 2006/003069 A1 | 1/2006 |
| WO | WO-2006095787 | 9/2006 |
| WO | WO-2007044049 | 4/2007 |
| WO | WO-2007077550 | 7/2007 |
| WO | WO-2008062313 | 5/2008 |
| WO | WO-2008065533 | 6/2008 |
| WO | WO-0163861 | 8/2010 |

OTHER PUBLICATIONS

"Advisory Action", U.S. Appl. No. 11/986,972, (Jan. 4, 2012), 2 pages.

"Advisory Action", U.S. Appl. No. 11/986,974, (Jun. 2, 2011), 3 pages.

"Examination Report under Section 18(3)", Application No. GB0723119.4, (Apr. 27, 2011), 1 page.

"Final Office Action", U.S. Appl. No. 11/986,835, (Jun. 23, 2010), 20 pages.

"Final Office Action", U.S. Appl. No. 11/986,835, (Jul. 8, 2011), 29 pages.

"Final Office Action", U.S. Appl. No. 11/986,972, (Oct. 19, 2011), 11 pages.

"Final Office Action", U.S. Appl. No. 11/986,973, (Apr. 13, 2011), 23 pages.

"Final Office Action", U.S. Appl. No. 11/986,973, (Apr. 24, 2012), 24 pages.

"Final Office Action", U.S. Appl. No. 11/986,974, (Mar. 17, 2011), 8 pages.

"Final Office Action", U.S. Appl. No. 11/986,985, (Jun. 7, 2012), 14 pages.

"International Preliminary Report on Patentability", (Chapter I for the Patent Cooperation Treaty) Application No. PCT/IB2007/004259, (Jun. 11, 2009), 9 pages.

"International Report on Patentability", (Chapter I of the Patent Cooperation Treaty) Application No. PC/IB2007/004279, (Jun. 11, 2009), 7 pages.

"International Report on Patentability", (Chapter I of the Patent Cooperation Treaty) Application No. PCT/IB2007/004260, (Jun. 11, 2009), 7 pages.

"International Search Report and Written Opinion", Application No. PCT/IB2007/004251, (Jul. 15, 2008), 8 pages.

"International Search Report and Written Opinion", Application No. PCT/IB2007/004259, (Jul. 11, 2008), 13 pages.

"Non Final Office Action", U.S. Appl. No. 11/986,972, (Mar. 30, 2011), 10 pages.

"Non Final Office Action", U.S. Appl. No. 11/986,973, (Oct. 22, 2010), 22 pages.

"Non Final Office Action", U.S. Appl. No. 11/986,973, (Nov. 23, 2011), 24 pages.

"Non Final Office Action", U.S. Appl. No. 11/986,976, (Oct. 27, 2011), 8 pages.

"Non-Final Office Action", U.S. Appl. No. 11/986,835, (Nov. 24, 2010), 25 pages.

"Non-Final Office Action", U.S. Appl. No. 11/986,835, (Dec. 21, 2009), 10 pages.

"Non-Final Office Action", U.S. Appl. No. 11/986,974, (Jul. 18, 2011), 11 pages.

"Non-Final Office Action", U.S. Appl. No. 11/986,974, (Sep. 29, 2010), 11 pages.

"Non-Final Office Action", U.S. Appl. No. 11/986,985, (Oct. 25, 2011), 12 pages.

"Notice of Allowance", U.S. Appl. No. 11/986,835, (Mar. 15, 2012), 13 pages.

"Notice of Allowance", U.S. Appl. No. 11/986,835, (Dec. 6, 2011), 13 pages.

"Notice of Allowance", U.S. Appl. No. 11/986,835, (Dec. 6, 2011), 8 pages.

(56) References Cited

OTHER PUBLICATIONS

"Notice of Allowance", U.S. Appl. No. 11/986,974, (Mar. 15, 2012), 12 pages.
"Notice of Allowance", U.S. Appl. No. 11/986,976, (Apr. 5, 2012), 4 pages.
"Notice of Allowance", U.S. Appl. No. 11/986,977, (May 3, 2011), 10 pages.
"Preliminary Report on Patentability and Written Opinion", Application No. PCT/IB2007/004260, (Jun. 3, 2009), 8 pages.
"Preliminary Report on Patentability and Written Opinion", Application No. PCT/IB2007/004279, (Jun. 3, 2009), 8 pages.
"Search Report", Application No. GB 0723123.6, (Apr. 18, 2008), 1 page.
"Search Report", Application No. GB0623103.9, (Feb. 14, 2008), 1 page.
"Supplemental Notice of Allowance", U.S. Appl. No. 11/986,977, (Aug. 17, 2011), 2 pages.
"Supplemental Notice of Allowance", U.S. Appl. No. 11/986,977, (Jun. 21, 2011), 2 pages.
"Advisory Action", U.S. Appl. No. 11/986,985, (Jul. 19, 2012), 3 pages.
"Foreign Office Action", Chinese Application No. 200780044111.0, (May 3, 2012), 12 pages.
"Foreign Office Action", European Application No. 07859297.9, (Nov. 9, 2009), 4 pages.
"Foreign Office Action", European Application No. 07866605.4, (Feb. 8, 2010), 3 pages.
"Foreign Office Action", New Zealand Application No. 577113, (Dec. 22, 2010), 2 pages.
"Foreign Office Action", New Zealand Application No. 577113, (Jul. 25, 2012), 3 pages.
"Foreign Office Action", New Zealand Application No. 577113, (Apr. 12, 2012), 3 pages.
"Foreign Office Action", New Zealand Application No. 601925, (Aug. 27, 2012), 2 pages.
"Notice of Allowance", U.S. Appl. No. 11/986,985, Dec. 6, 2013, 7 pages.
"Further Examination Report", NZ Application No. 601925, Mar. 5, 2014, 2 pages.
"First Examination Report", NZ Application No. 622322, Mar. 21, 2014, 2 pages.

\* cited by examiner

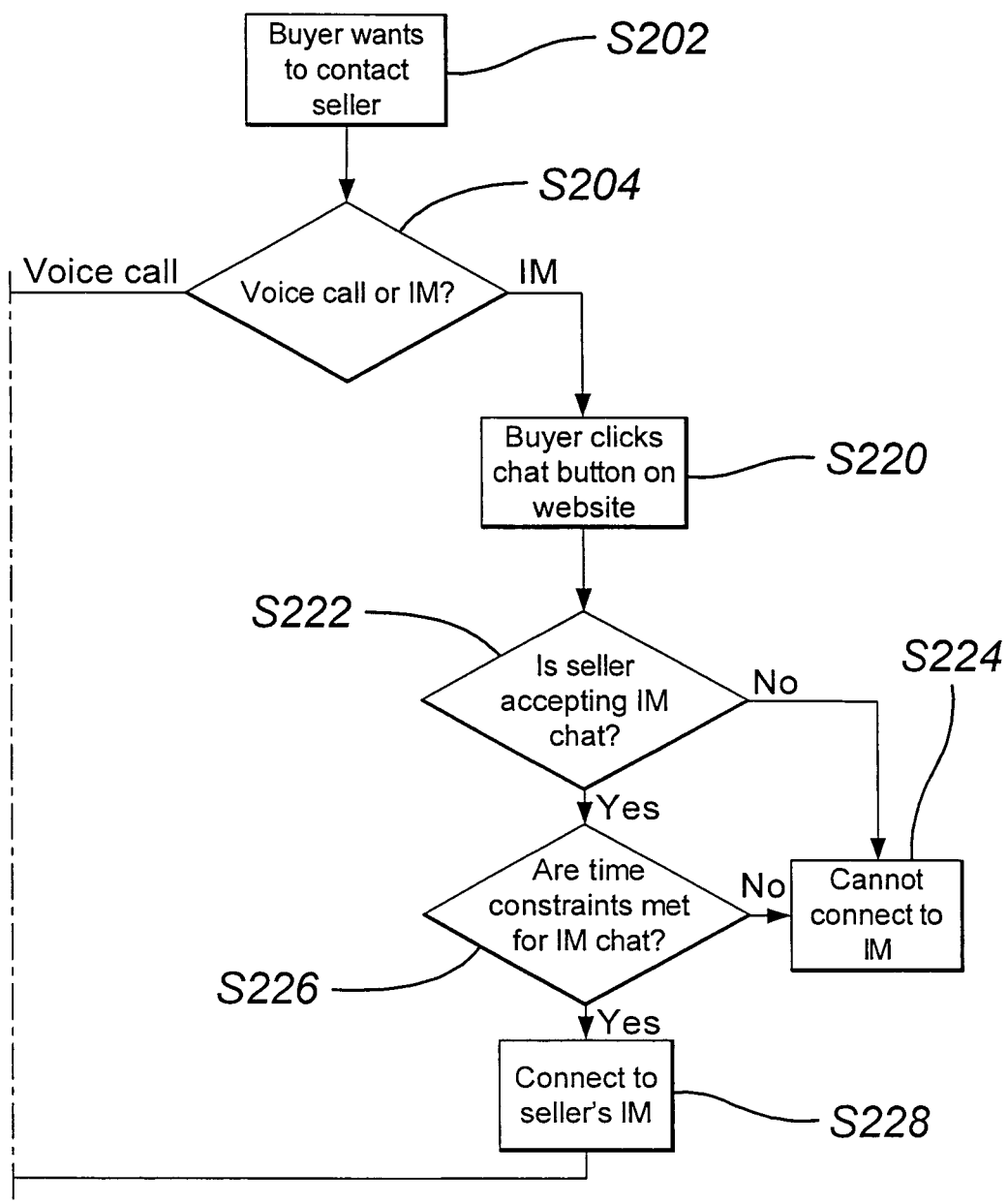
Fig. 2 (Contd.)

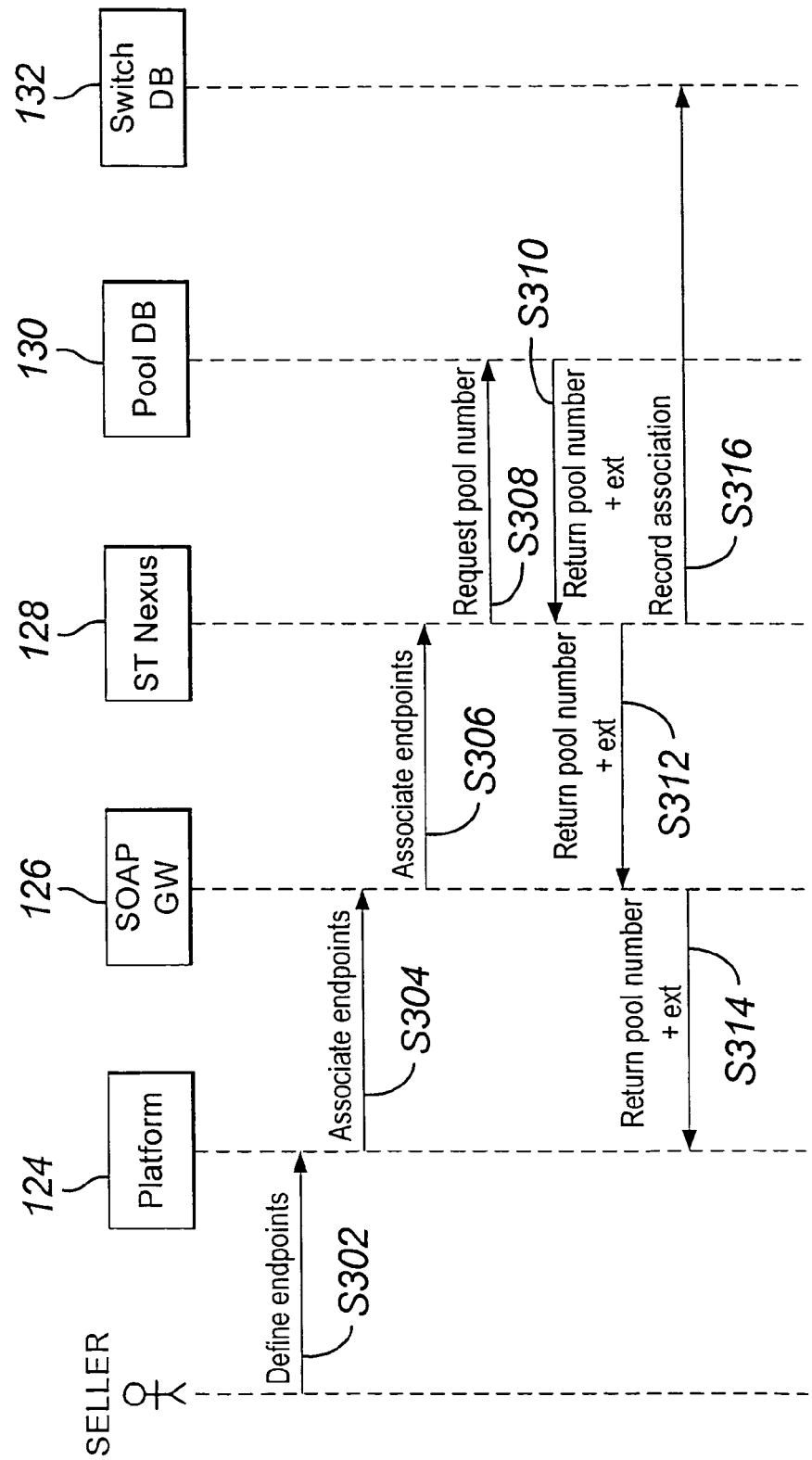

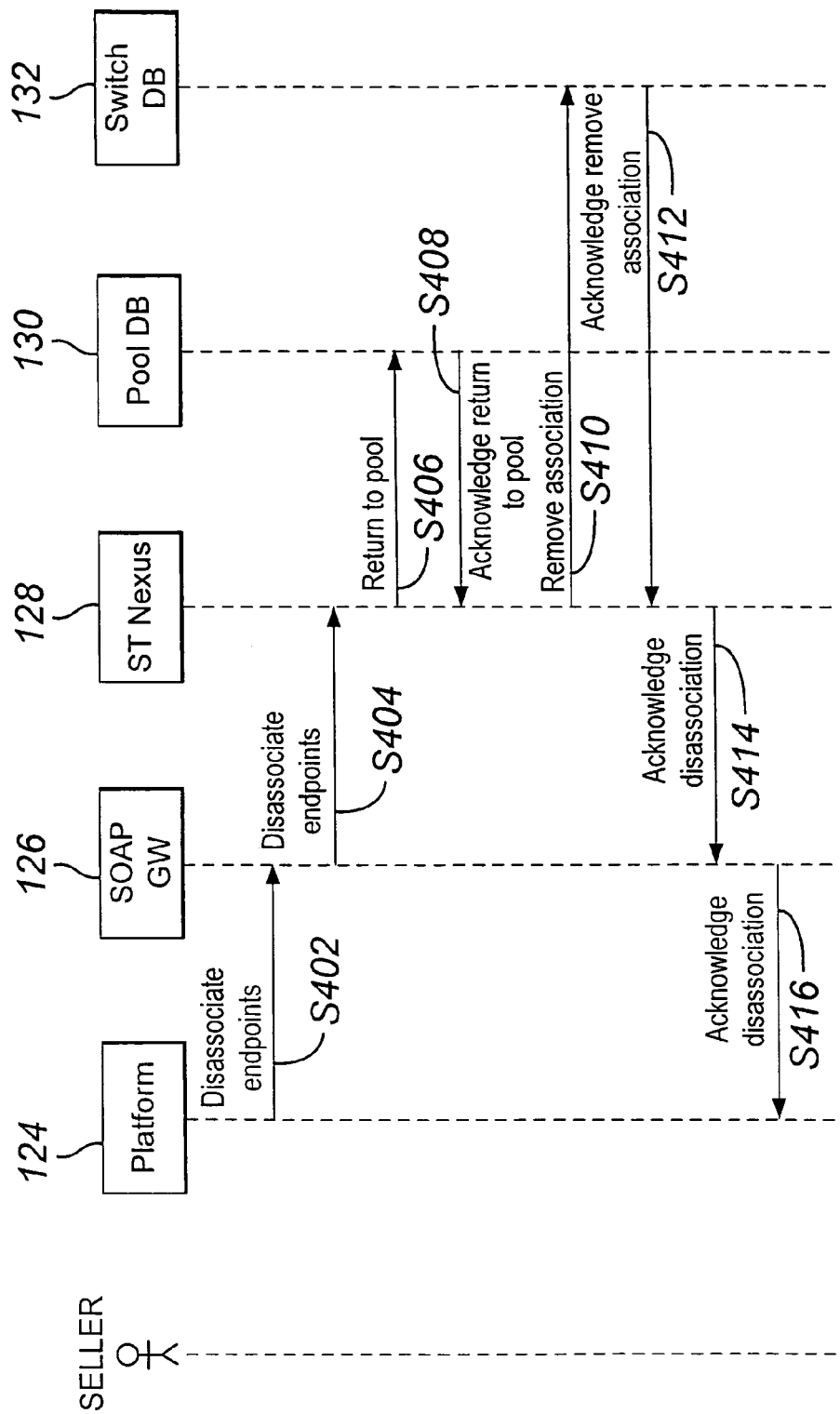

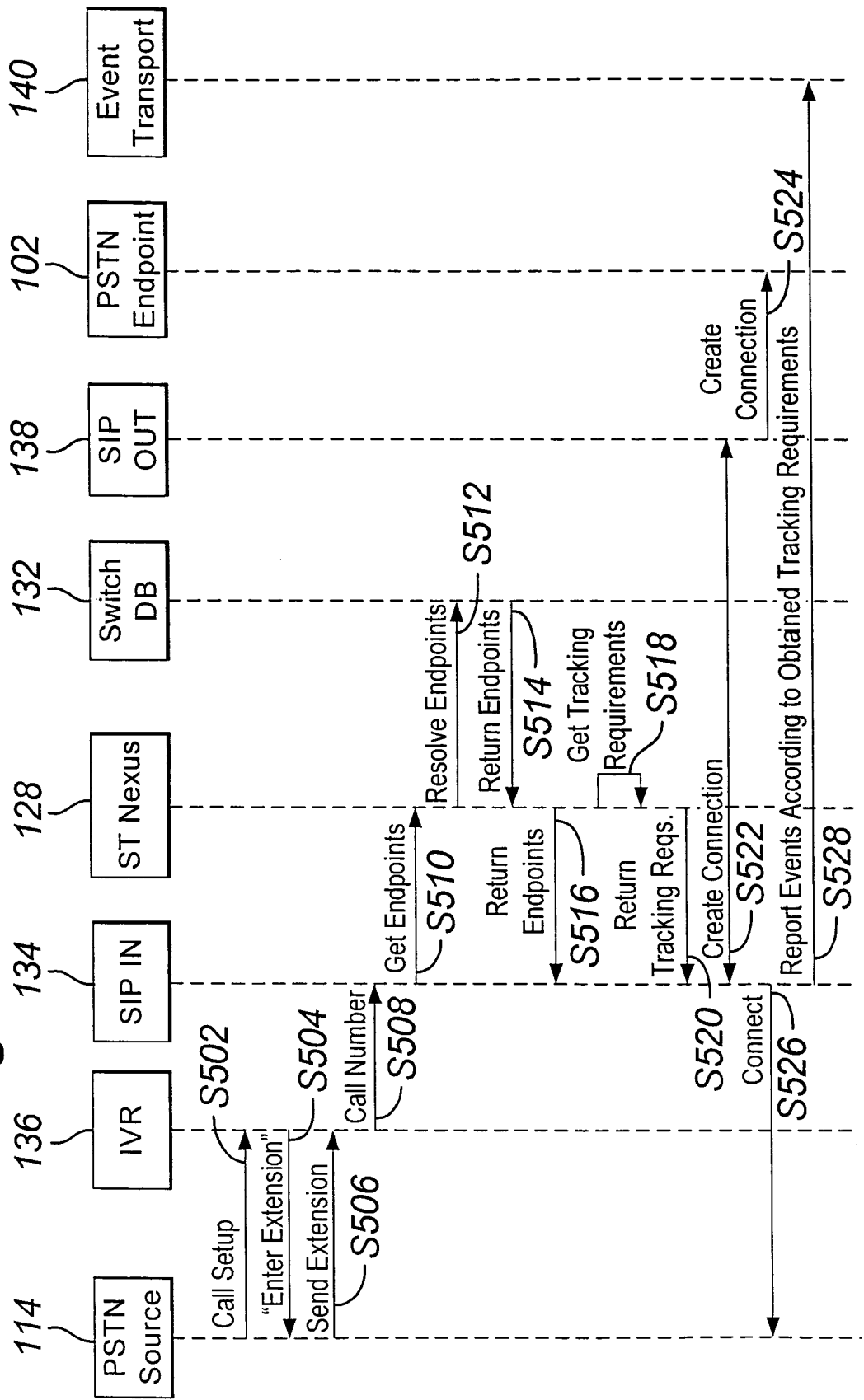

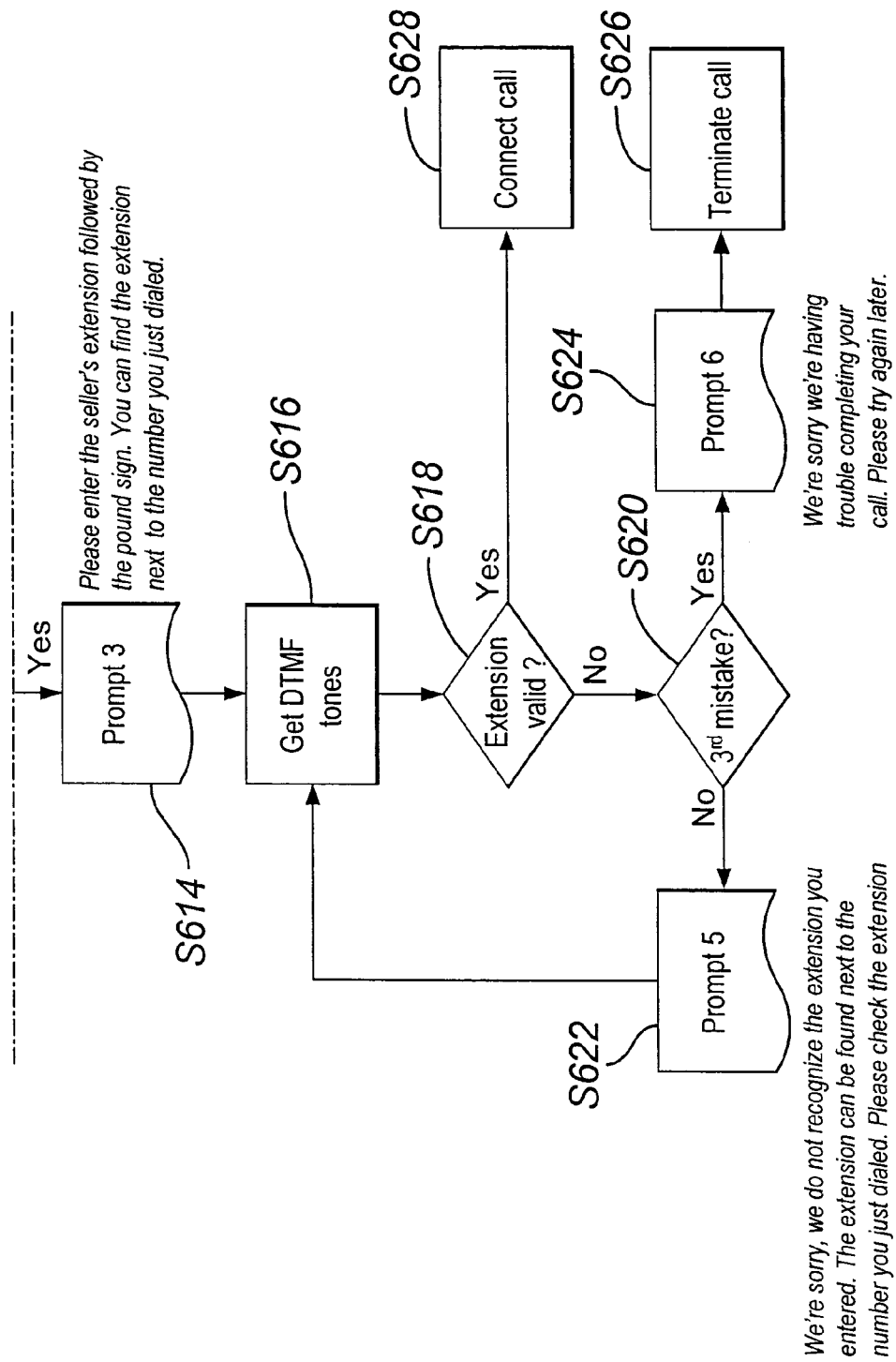
Fig.6(Contd.)

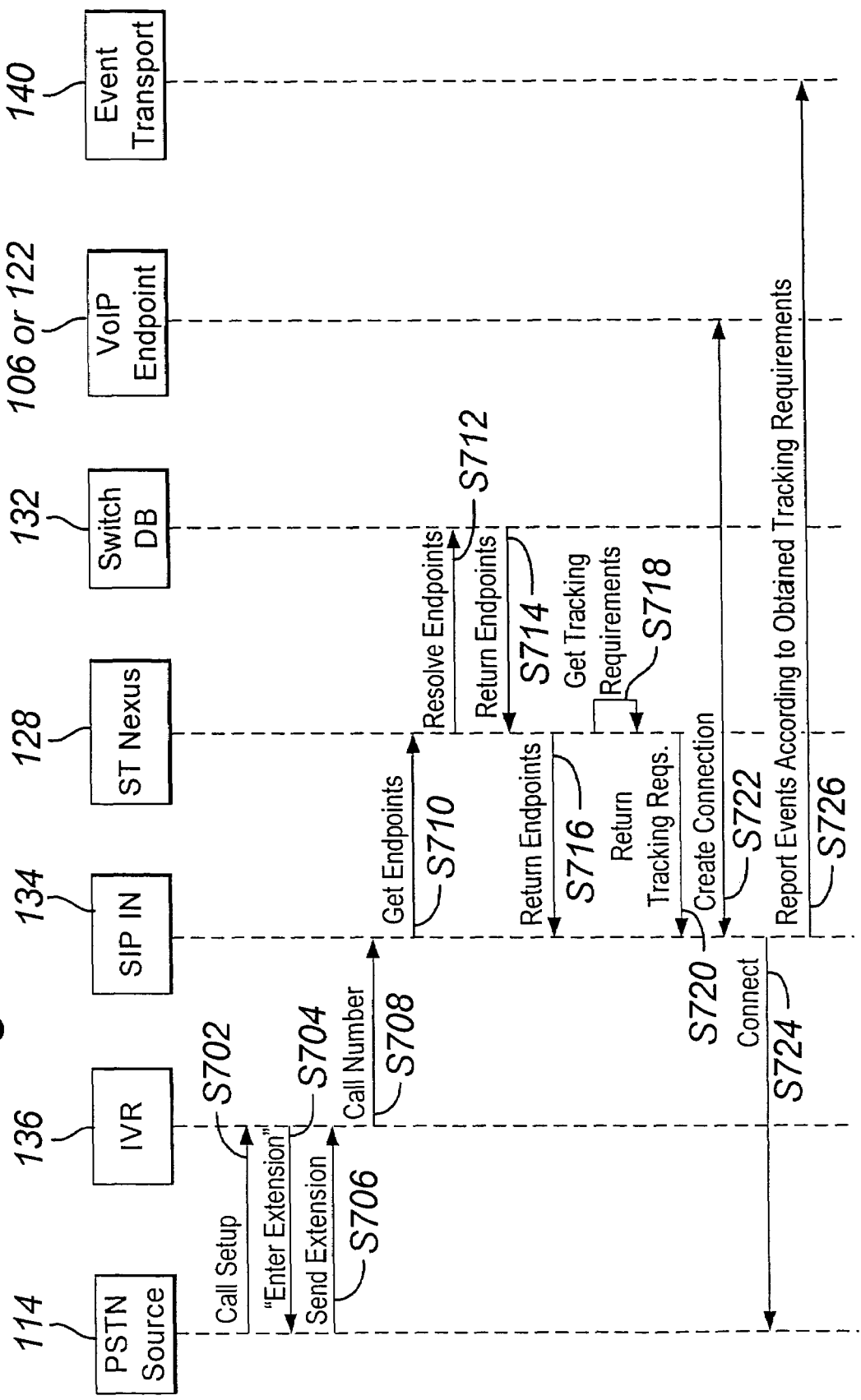

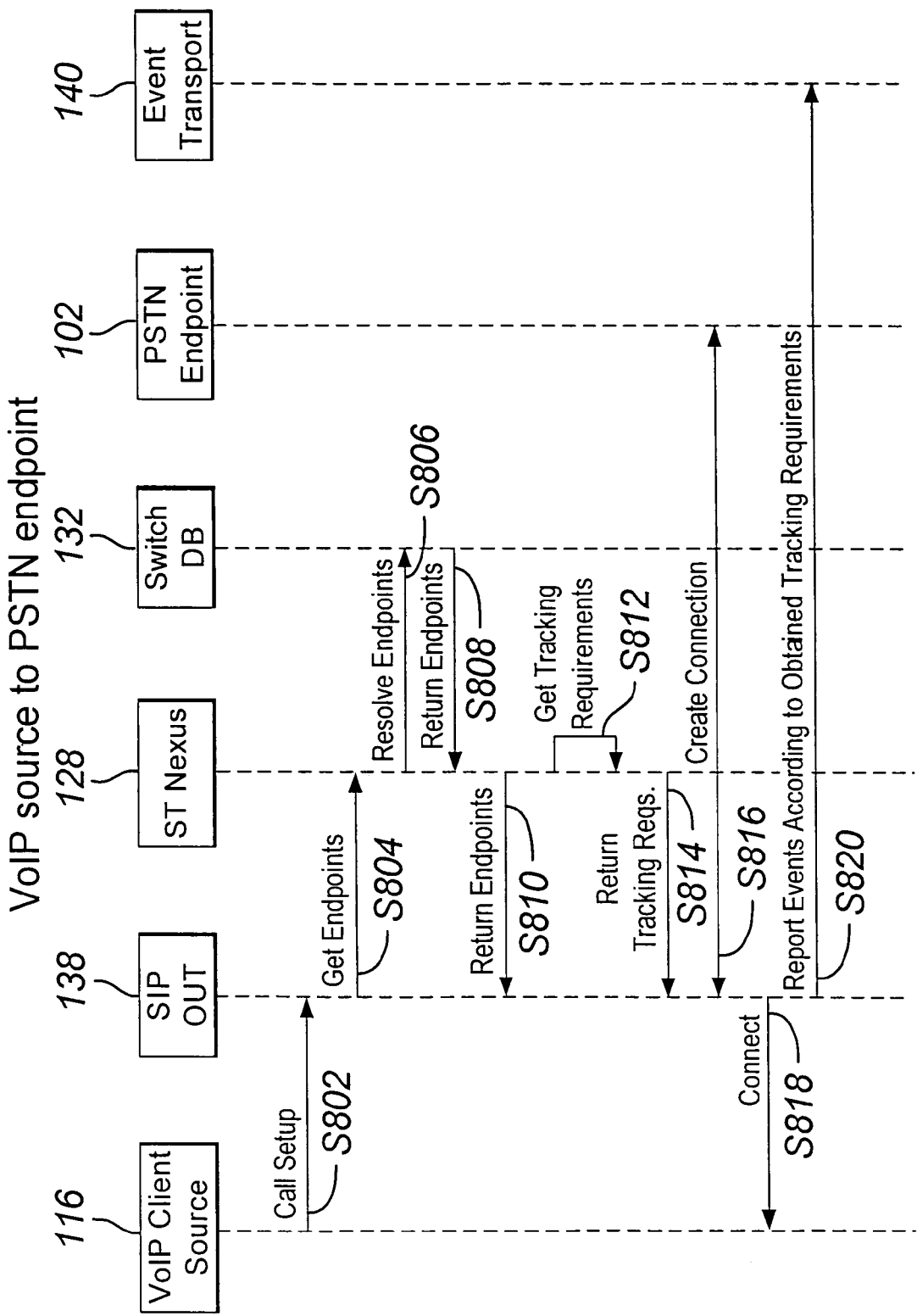

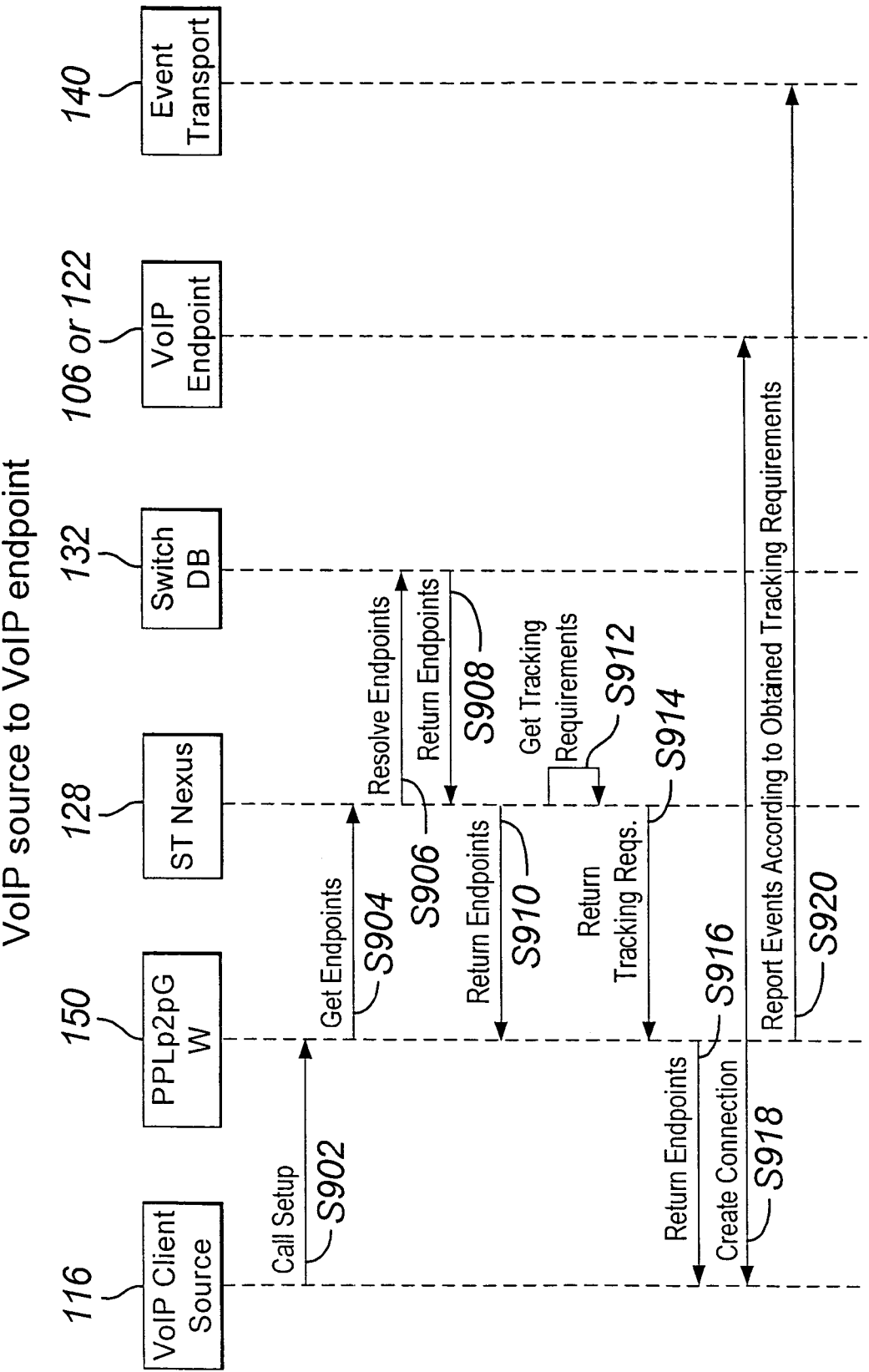

COMMUNICATION SYSTEM AND METHOD

RELATED APPLICATION

This application claims priority under 35 U.S.C. §119 or 365 to Great Britain Application No. GB 0623103.9, filed Nov. 20, 2006. The entire teachings of the above application are incorporated herein by reference.

TECHNICAL FIELD

This invention relates to a communication system and method in which a connection is established without a user having knowledge of the contact details of the other party, and the contact details remain anonymous to both parties.

SUMMARY

According to one aspect of the present invention there is provided a method of establishing communication between a first and second user over a communications network, said second user being associated with contact information for at least one destination node. The method includes allocating the contact information for the at least one destination node an identity from a set of available identities; displaying a hyperlink containing said identity on a display, wherein said hyperlink does not contain the contact information of the second user; said first user viewing said display using a terminal connected to the communications network and activating said hyperlink; responsive to activating said hyperlink, transmitting from a client executed on said terminal a message to initiate communication, said message comprising said identity; responsive to receiving said message at a network node, said network node translating said identity to said contact information for the at least one destination node; and said network node selecting one or more destination nodes from the at least one destination node and establishing a connection over the communications network between the client and the selected one or more destination nodes using said contact information.

According to another aspect of the present invention there is provided a method comprising allocating to the contact information for the at least one destination node a telephone number from a pool of available telephone numbers; displaying said telephone number on a display, wherein said telephone number does not relate to the contact information of the second user; said first user viewing said display using a terminal connected to the communications network and dialling said telephone number using a communications terminal; responsive to dialling said telephone number, said communications terminal transmitting a message to initiate communication comprising the telephone number; responsive to receiving said message at a network node, said network node translating said telephone number to said contact information for the at least one destination node; and said network node selecting one or more destination nodes from the at least one destination node and establishing a connection over the communications network between the communications terminal and the selected one or more destination nodes using said contact information.

According to another aspect of the present invention there is provided a user terminal for establishing communication between a first and second user over a communications network, said second user being associated with contact information for at least one destination node. The user terminal comprises the means for displaying a display to the first user, said display comprising a hyperlink containing an identity allocated to the contact information for the at least one destination node from a set of available identities, wherein said hyperlink does not contain the contact information of the second user; means for selecting said hyperlink; and a client executed on the user terminal arranged to transmit a message to initiate communication over said communications network, said message comprising said identity, wherein said message is received at a network node arranged to translate said identity to said contact information for the at least one destination node, select one or more destination nodes from the at least one destination node, and establish a connection over the communications network between the client and the selected one or more destination nodes using said contact information.

According to another aspect of the present invention there is provided a system for establishing communication between a first and second user over a communications network, said second user being associated with contact information for at least one destination node. The system comprises a user terminal comprising means for displaying a display to the first user, said display displaying a telephone number allocated to the contact information for the at least one destination node from a pool of available telephone numbers, wherein said telephone number does not relate to the contact information of the second user; and a communications terminal comprising a keypad, wherein said first user enters the telephone number using the keypad, said communications terminal being arranged to transmit a message to initiate communication, said message comprising the telephone number, wherein said message is received at a network node arranged to translate said telephone number to said contact information for the at least one destination node, select one or more destination nodes from the at least one destination node, and establish a connection over the communications network between the communications terminal and the selected one or more destination nodes using said contact information.

According to another aspect of the present invention there is provided a method comprising allocating the contact information for the at least one destination node an identity from a set of available identities; providing said identity to said first user whilst withholding the contact information from the first user; transmitting a message to initiate communication comprising the identity from a user terminal of said first user; responsive to receiving said message at a network node, said network node translating said identity to said contact information for the at least one destination node; and said network node selecting one or more destination nodes from the at least one destination node and establishing a connection over the communications network between the user terminal of said first user and the selected one or more destination nodes using said contact information.

According to another aspect of the present invention there is provided a system comprising means for allocating the contact information for the at least one destination node an identity from a set of available identities; means for providing said identity to said first user whilst withholding the contact information from the first user; user terminal means, operable by said first user, for transmitting a message to initiate communication comprising the identity; and a network node comprising means for receiving said message, means for translating said identity to said contact information for the at least one destination node, means for selecting one or more destination nodes from the at least one destination node, and means for establishing a connection over the communications network between the user terminal means and the selected one or more destination nodes using said contact information.

According to another aspect of the present invention there is provided a network element for establishing communication between a first and second user over a communications network, said second user being associated with contact information for at least one destination node, comprising: means for allocating the contact information for the at least one destination node an identity from a set of available identities; means for providing said identity to said first user whilst withholding the contact information from the first user; means for receiving a message to initiate communication comprising said identity from a user terminal of said first user, means for translating said identity to said contact information for the at least one destination node; means for selecting one or more destination nodes from the at least one destination node; and means for establishing a connection over the communications network between the user terminal and the selected one or more destination nodes using said contact information.

According to another aspect of the present invention there is provided a method comprising allocating the contact information for the at least one destination node an identity from a set of available identities; providing said identity to said first user; transmitting a message to initiate communication comprising the identity from a user terminal of said first user; responsive to receiving said message at a network node, said network node translating said identity to said contact information for the at least one destination node; and said network node selecting one or more destination nodes from the at least one destination node and establishing a connection over the communications network between the user terminal of said first user and the selected one or more destination nodes using said contact information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 shows a process for associating endpoints with an identity.

FIG. 4 shows a process for disassociating endpoints with an identity.

FIG. 5 shows a process for connecting a PSTN source to a PSTN endpoint.

FIG. 7 shows a process for connecting a PSTN source to a VoIP endpoint.

FIG. 8 shows a process for connecting a VoIP source to a PSTN endpoint.

FIG. 9 shows a process for connecting a VoIP source to a VoIP endpoint.

DETAILED DESCRIPTION

Figure 1:
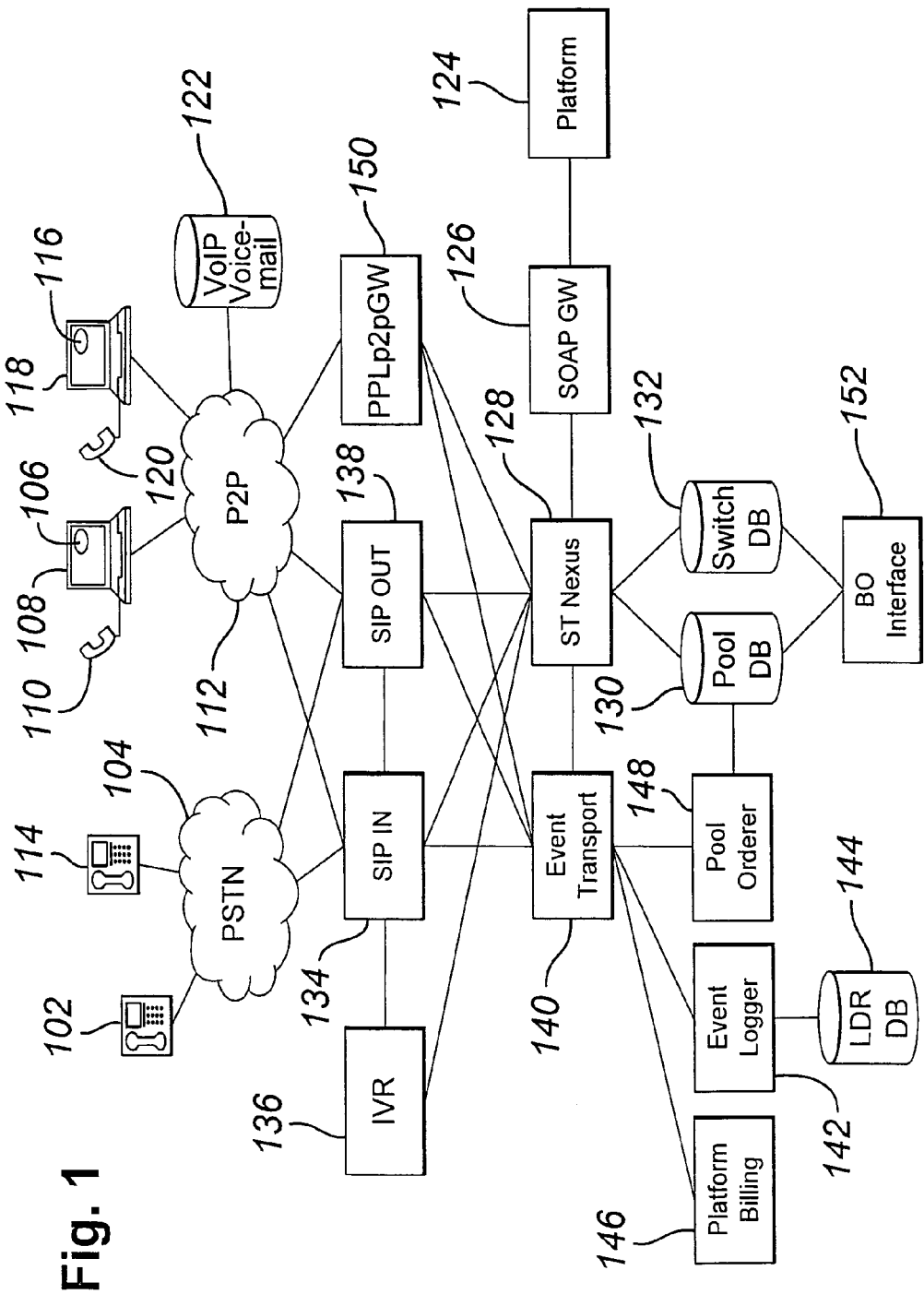
FIG. 1 shows a communication system enabling anonymous communication between parties.

Reference is first made to FIG. 1, which illustrates a system that enables communication to be initiated between two parties that do not know each other, and allows them keep their identities secret until they choose to reveal them. The system can dynamically allocate an anonymous voice over internet protocol ("VoIP") identity and/or provides a pool of anonymous toll-free (or local) phone numbers that can be allocated to a user, in order to allow that user to be contacted for free (or at local rates), and uses event tracking to monitor the use of the system, which can be used to bill the user according to how often this user has been contacted. Furthermore, the user can define different types of "endpoints" as to where the call should be routed, and can set rules to define, for example, the time of day during which the user can be contacted at a specific endpoint.

In the following exemplary embodiment, the user that wishes to be contactable is called the "seller". In this example, the seller is offering goods or services on a website called the "platform" that is run by a third party. The platform may for example be an auction website, a classified advert website or other type of website that advertises goods or services for sale. The user that wishes to contact the seller is called the "buyer". It will nevertheless be appreciated that these techniques are also useful in other scenarios apart from merely "buyers" and "sellers". The seller does not want his personal contact information (e.g. telephone number or VoIP ID) to be publicly disclosed on the platform website. However, the seller does want to be able to be contacted by buyers. Similarly, the buyer, who does not know the seller, does not want to have any of his own personal contact information disclosed to the seller without his permission.

The seller is contactable at a number of "endpoints" or destinations. In preferred embodiments, the endpoints are a public switched telephone network ("PSTN") terminal (associated with the seller's telephone number), a VoIP client executed on a personal computer ("PC") of the seller, VoIP voicemail for the seller, and an instant messaging ("IM") client running on the PC. These endpoints are illustrated in FIG. 1. VoIP and IM communication can be implemented using peer-to-peer ("P2P") communication systems that allow the user of a personal computer to engage in voice and IM communication across a computer network such as the Internet. These systems are beneficial to the user as they are often of significantly lower cost than traditional telephony networks, such as fixed line or mobile cellular networks. This may particularly be the case for long distance calls. To use a peer-to-peer service, the user must install and execute client software on their PC. The client software provides the VoIP and IM connections as well as other functions such as registration and authentication. A call may be made using VoIP in accordance with methods known in the art, such as disclosed in WO 2005/009019.

In alternative embodiments, other types of endpoint are also possible.

Referring to FIG. 1, the PSTN terminal 102 is shown connected to a PSTN network 104. The VoIP client 106 is shown executed on the seller's PC 108, to which is connected a handset 110 for making and receiving calls. The IM client in FIG. 1 is integrated into the VoIP client 106, although this can also be provided as a separate application (if the separate application used the same protocol for communication as the VoIP client). The PC 108 is connected to a P2P network 112, which operates over the Internet. A VoIP voicemail server 122 is shown connected to the P2P network 112 for storing voicemails for the seller.

The seller may choose to be contactable by all or some of these endpoints. The seller can also define parameters to be associated with the endpoints. For example, the user can define that one or more of the endpoints are only contactable during certain times, e.g. office hours.

Similarly, the buyer also has a selection of sources from which he can initiate contact with the seller. These are a PSTN terminal, a VoIP client running on a PC, and an IM client running on a PC. These are illustrated in FIG. 1 as PSTN terminal 114 connected to the PSTN network 104, VoIP (and IM) client 116 executed on PC 118, which is connected to handset 120 and P2P network 112.

Figure 2:
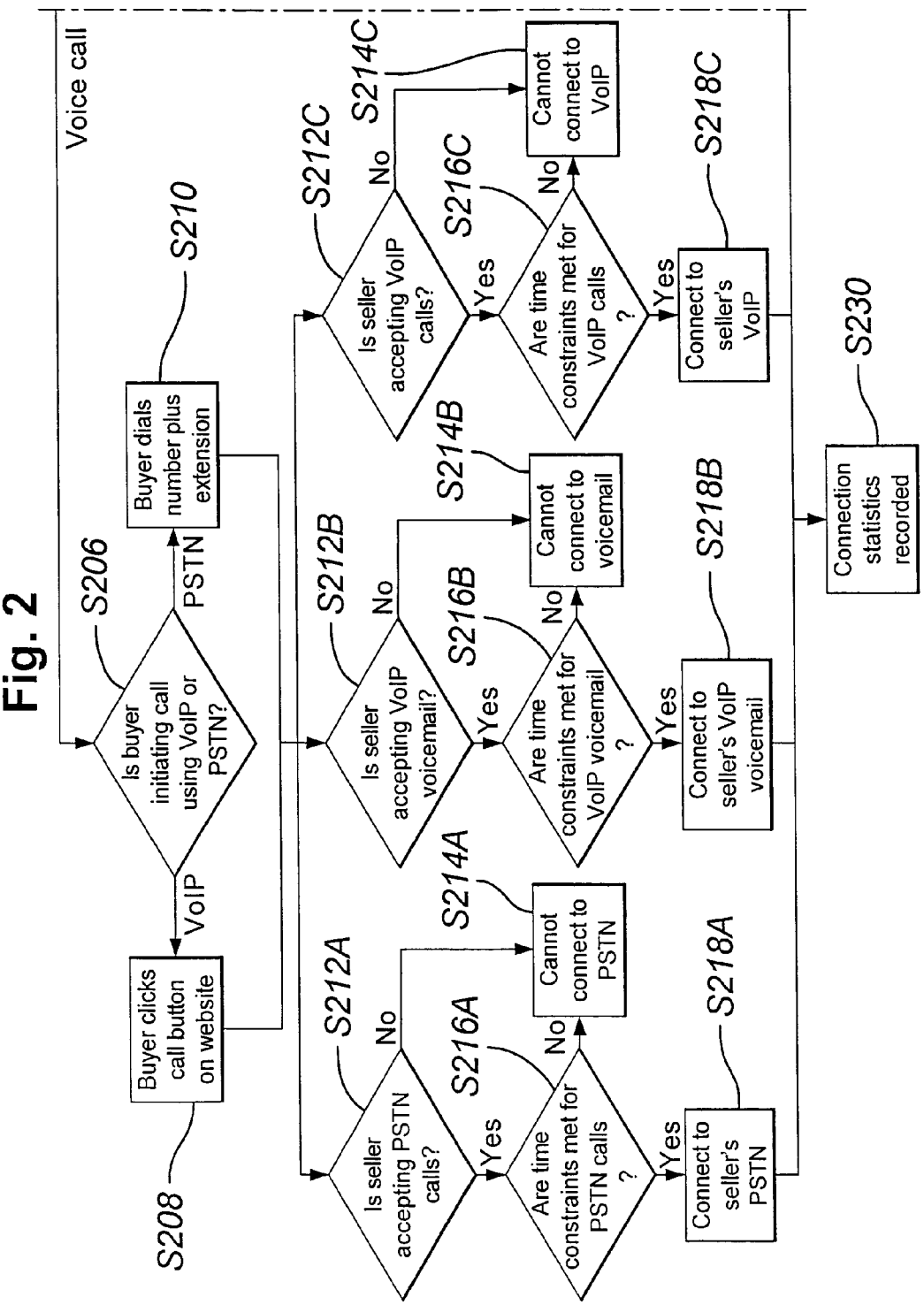
FIG. 2 shows a flowchart of the call set up between a buyer and a seller.

The basic mechanism for making contact between the buyer and the seller can be seen with reference to FIG. 2. In step S202, the buyer has viewed the product being advertised by the seller on a webpage, and wishes to contact the seller for further information. The buyer can choose to contact the seller by IM or a voice call in step S204. If the buyer chooses to contact the seller by a voice call, then, in step S206 the buyer can choose to initiate the voice call either by VoIP (using the VoIP client 116 and PC 118) or by PSTN (using the PSTN terminal 114). If the buyer chooses a VoIP voice call, then in step S208 he can initiate the call simply by clicking on a link shown in the webpage. The VoIP client 116 will then automatically initiate the connection. Alternatively, if the buyer chooses to use a PSTN voice call, then in step S210 he dials a number plus an extension displayed on the webpage using the PSTN terminal 114. As mentioned previously, this can be a toll-free number allocated by the system (described in more detail below).

The system then analyses how the seller can receive a call in steps S212A to S212C, i.e. which endpoints are available. For example, the system checks whether the seller is contactable via a PSTN voice call in step S212A, whether the seller can be contacted using his VoIP voicemail in step S212B, and whether the seller can be contacted via a VoIP call in step S212C. If the seller is not accepting PSTN calls, then the connection to PSTN terminates in step S214A. If the seller is not accepting VoIP voicemail, then the connection to VoIP voicemail terminates in step S214B. If the seller is not accepting VoIP calls, then the connection to VoIP terminates in step S214C.

If the seller is accepting PSTN calls, then, in step S216A, the system checks whether the seller has defined particular times during which this endpoint may be contacted (described in more detail below). Similarly, if the seller is accepting VoIP voicemail or VoIP calls, then the system checks whether time constraints have been set for these endpoints in S216B and S216C, respectively. If PSTN calls, VoIP voicemail or VoIP calls are not being taken at this time, the connection terminates in S214A, S214B, or S214C, respectively.

All of the endpoints that are accepting calls at this time are simultaneously connected in steps S218A (for PTSN calls), S218B (for VoIP voicemail) and S218C (for VoIP calls). This causes all the selected available endpoints to ring simultaneously, and the one endpoint that is answered first is connected to the buyer. As soon as one endpoint is answered, the others cease ringing.

If, following S204, the buyer chose to contact the seller by IM by clicking a chat button displayed on the website in step S220, then in step S222 it is determined whether the seller will currently accept IM chats. If the seller is not accepting IM chats, then the buyer is not connected (S224). If the seller is accepting IM chat, then in step S226 it is ascertained whether the seller is accepting IM chats at the current time (depending on preferences set by the seller). If not, the buyer is not connected (S224). If the seller is accepting IM chats at this time, then in step S228 the buyer is connected to the IM client of the seller.

Once, the buyer is connected to the seller by any of the above means, then the buyer and seller can communicate in an interactive manner (except for voicemail where the buyer can leave a message). Following any of the successful connections, connection statistics are recorded and stored in step 230. These statistics can be used to provide information on the system operation, and for charging for its use, as will be described in more detail hereinafter.

As mentioned previously, the operation described in FIG. 2 above must operate in a way that does not disclose the personal contact details of either the buyer or the seller to the other party. This means that the link clicked by the buyer in step S208 must not contain or reveal either the VoIP ID or personal PSTN number of the seller, and the number dialled by the buyer in step S210 must not be related to the personal PSTN number or VoIP ID of the seller. Similarly, the link clicked by the buyer to initiate an IM chat in step S220 must not reveal the IM ID of the seller. Furthermore, the VoIP ID, IM ID or PSTN number of the buyer must also not be provided to the seller. The system that allows this to be achieved is now described by referring again to FIG. 1.

The first stage in the operation of the system in FIG. 1 is for the seller to sign up to the system with the operator of the platform 124. This involves the seller navigating to a webpage of the platform website (e.g. the auction website) using the Internet and defining the available endpoints, and setting their associated parameters such as the hours during which the endpoints may be contacted and the timezone of the seller. The seller may define one or more endpoints. For example, the seller may define a PSTN endpoint by providing the platform 124 with his personal PSTN number. The seller may also define a VoIP endpoint by providing the platform 124 with his VoIP ID. The VoIP ID can also be used to define a VoIP voicemail endpoint. Similarly, an IM endpoint is defined by providing the platform 124 with his IM ID (which may be the same as his VoIP ID). The platform 124 is trusted by the seller, and the seller is therefore willing to provide these personal contact details to the platform 124. This operation is illustrated by step S302 in FIG. 3.

Once the seller has defined the endpoints that can be used to contact him, the platform 124 performs an association between the endpoint information and a dynamically allocated identity (either an anonymous PSTN telephone number or VoIP ID) to obfuscate the endpoints. Two types of association can be performed.

The first type can associate any type of endpoint (e.g. a PSTN endpoint, a VoIP endpoint and/or a VoIP voicemail endpoint) with a dynamically allocated PSTN number. In preferred embodiments, the seller can be dynamically allocated a toll-free PSTN number that is provided to the seller by the operator of the system. This permits the buyer to contact the seller for free using this PSTN number, without requiring the seller to purchase an expensive toll-free number himself. The system for allocating toll-free numbers will be described in further detail below. In alternative embodiments, the PSTN number could be a local call number instead of a toll-free number.

The second type of association associates a PSTN endpoint, a VoIP endpoint, a VoIP voicemail endpoint and/or an IM endpoint with an anonymous, randomly generated, association ID that can be incorporated into a link (known as a "callto:" link) or button on a webpage. This permits the buyer to contact any endpoint of the seller using the VoIP system over the P2P network 112 by clicking the link or button on the platform webpage.

The association process is illustrated in more detail in FIG. 3. The two types of association are performed by the platform 124 sending an associate message (S304) to a simple object access protocol ("SOAP") gateway 126. The SOAP gateway 126 provides an interface between the platform 124 (which can be operated by third parties) and the internal operation of the system shown in FIG. 1.

In order to perform the first type of association (PSTN association), the SOAP gateway 126 sends an associate message (S306) to a switching and tracking ("ST") nexus 128. The associate message contains information including the identity of the platform, an array of endpoints to associate, a country code for the requested number, a flag to set whether the returned number is to be toll-free, an optional preferred number, and a threshold to be used in the allocation of numbers (explained in more detail below). The optional preferred number can be included if the platform would prefer to use a particular number, for example if it has used the number before.

In response to the associate message, the ST nexus 128 interrogates (S308) a pool database ("DB") 130, which contains a set of available PSTN numbers that can be allocated. The available numbers are ordered in the pool according to a number of factors. For example, for each available PSTN number in the pool the following information is maintained:

- The number of calls made to the PSTN number whilst associated to an endpoint. The higher the number of calls made, the lower down the list of pool numbers the PSTN number will be.
- The number of calls made to the PSTN number whilst it was not associated to an endpoint (these calls fail due to a lack of association). The higher the number, the lower down the list of pool numbers the PSTN number will be.
- The time at which the number was disassociated. The longer a number has been disassociated, the higher up the list of pool numbers the PSTN number will be.
- The length of time a number has been associated with an endpoint. The longer a number has been associated with an endpoint, the lower down the list of pool numbers the PSTN number will be.
- The time of the last call to the PSTN number. The more recent the last call, the lower down the list of pool numbers the PSTN number will be.

Some or all of the above factors are combined to give an overall "cleanliness" score ("CS") for each of the PSTN numbers in the pool, which is related to how much the PSTN number has been used. The numbers in the pool DB 130 are ordered according to this factor. The pool DB 130 returns the PSTN number at the top of the list to the ST nexus 128 in step S310 (unless a preferred number was specified, in which case this is returned if it is available).

The cleanliness score for each of the PSTN numbers is calculated by deriving three cleanliness values ("CV") from factors such as those above and calculating a weighted sum of these values. Note, however, that this is only one example of the way in which the numbers in the pool could be ordered, and many other methods could also be utilised.

Each of the three CVs has a "weight" (W1-W3), which indicates what how much that parameter should contribute to the overall cleanliness score. Each weight ranges from 0% to 100%. The weights of all parameters should add up to 100%.

The CS is then calculated from the three CV values and weights as follows:

$$CS = CV1 \times W1 + CV2 \times W2 + CV3 \times W3$$

A larger CS implies a "cleaner" PSTN number. The CS value ranges from 0 (completely dirty) to 100 (completely clean). If two PSTN numbers have the same CS value, then the tie-breaker is the disassociation time (i.e. the number with the longest time since disassociation goes higher in the list), and if there is no distinction in disassociation times, the order of the numbers is determined using a random selection. Brand new numbers that have never been associated are given a CS of 100. They may also be given a pseudo-random component so that numbers with the same CS will be returned in random order.

Each CV can be allocated a "threshold". If the cleanliness value is below the threshold, parameter is "clean" and contributes fully to cleanliness score. Otherwise, the value of the CV parameter relative to the threshold decides how much the parameter contributes to CS. The result of this is a cleanliness value of 0 to 100.

Examples of three cleanliness values calculated from the above factors are presented below.

The first CV value is the time since disassociation. This is the difference between the time "now" and the above-mentioned factor of the time at which the number was disassociated. As the time since disassociation grows, the number gets cleaner and cleaner. Once the time since disassociation reaches a threshold, it is considered 100% clean. In preferred embodiments, the threshold is given a value of 7 days. In preferred embodiments, this CV is also given a weighting of 33%. In alternative embodiments, other values for these parameters can also be used.

The calculation of the CV for the time since disassociation can be represented as follows, where TSD=time since disassociation; $T_{TSD}$=threshold for the time since disassociation; and $CV_{TSD}$=cleanliness value for the time since disassociation.

$$TSD = now - \text{Time of disassociation}$$

If $TSD > T_{TSD}$ $$CV_{TSD} = 100$$

else $$CV_{TSD} = (TSD/T_{TSD}) \times 100$$

The second CV value is the time since the last call to the PSTN number. This is the time that has elapsed since the last call was placed (while associated) or attempted (while disassociated) to this number. This is determined as the difference between "now" and the last call time factor listed above. As the time since the last call grows, the number becomes cleaner and cleaner. Once it reaches a threshold, it is considered 100% clean. In preferred embodiments, the threshold is given a value of 30 days. In preferred embodiments, this CV is given a weighting of 34%. In alternative embodiments, other values for these parameters can also be used.

The calculation of the CV for the time since the last call can be represented as follows, where TSLC=time since last call; $T_{TSLC}$=threshold for the time since last call; and $CV_{TSLC}$=cleanliness value for the time since lat call.

$$TSLC = now - \text{time of last call}$$

If $TSLC > T_{TSLC}$ $$CV_{TSLC} = 100$$

else $$CV_{TSLC} = (TSLC/T_{TSLC}) \times 100$$

The third CV value is the number of calls per day to the PSTN number during association. This is determined as the number of calls made whilst associated divided by the length of time of association. The smaller the number of calls per day, the cleaner the number is. This CV parameter is decayed over time using a decay period. During this time, the CV parameter decays to 0, and is then 100% clean. A threshold is also defined at which the cleanliness value starts moving from 0 to 100. If the decayed parameter is greater than the threshold, its cleanliness value stays at 0 until it reaches the threshold. In preferred embodiments, the decay period is 30 days. In preferred embodiments, the threshold is given a value of 1 call per day. In preferred embodiments, this CV is also given a weighting of 33%. In alternative embodiments, other values for these parameters can also be used.

The calculation of the CV for the number of calls per day can be represented as follows, where NCPD=number of calls per day; $T_{NCPD}$=threshold for the number of calls per day; ET=the elapsed time since disassociation; DP=decay period; $NCPD_{Decayed}$=the decayed number of calls per day parameter; and $CV_{NCPD}$=cleanliness value for the number of calls per day.

$NCPD$=number of calls whilst associated/duration of association $ET$=now−Time of disassociation $NCPD_{Decayed}=NCPD\times(1-ET/DP)$ If $NCPD_{Decayed}>T_{NCPD}$ $CV_{NCPD}=0$ else if $NCPD_{Decayed}>0$ $CV_{NCPD}=(1-NCPD_{Decayed}/T_{NCPD})\times100$ else $CV_{NCPD}=100$ The above-mentioned calculation therefore provides a cleanliness score for each of the PSTN numbers, and allows then to be ordered according to their CS value. The PSTN number at the top of the list (i.e. the cleanest number) is returned to the ST Nexus 128.

In addition to returning the allocated PSTN number to the ST nexus 128, the pool DB 130 can also, in some embodiments, return an extension to be included with the allocated PSTN number. The use of an extension allows multiple sellers to share a single allocated PSTN number, but each seller has a unique extension number (if no extension is used, then obviously each seller is allocated a different PSTN number). This maximises the use of the available PSTN numbers, which is particularly important in the case of toll-free PSTN numbers, as the quantity of these available may be limited. The platform can specify whether an extension should be provided, and the number of digits in the extension. In preferred embodiments, extensions of length 0, 1, 2, 3 or 4 digits can be defined.

The allocated PSTN number and extension is then passed back from the ST nexus 128 to the SOAP gateway 126 in step S312 and from there to the platform 124 in step S314. The allocated PSTN number and extension associated with the seller's endpoints can then be used in the seller's listings shown on the platform website.

The ST nexus 128 also records a copy of the seller's endpoints with the associated parameters (such as contactable hours and timezone) and the allocated PSTN number associated with the endpoints in the switch DB 132 in step S316.

The seller has therefore associated his endpoints with a dynamically allocated PSTN number (preferably a toll-free number), that is unrelated to the personal information of the seller.

A similar operation can also be performed for the second type of association, to associate the endpoints with an association ID that can be incorporated into a callto link. The operation is the same as that shown in FIG. 3, except that the association ID is generated by the ST nexus 128 as a random sequence of bytes (the ST nexus must also check that this random sequence is not currently associated with an endpoint). The pool DB 130 is therefore not required, as the association ID is generated directly by the ST nexus 128 (i.e. steps S308 and S310 are not required). There is also no requirement for an extension in the case of an association ID being generated. The use of a random association ID incorporated into a callto link means that the contact details of the seller cannot be derived by looking at the text information within the link.

The platform can also disassociate the endpoints of a seller at any time, as illustrated in FIG. 4 for the case of disassociating an allocated PSTN number and returning it to the pool. This may be done, for example, following the end of the time that the seller's items are listed on the platform website, in order to return the allocated PSTN number to the pool for it to be reused. This can be performed by the platform 124 sending a message to the SOAP gateway ("GW") 126 in step S402, which transmits a disassociate message to the ST nexus 128 in step S404. The disassociate message contains the endpoints to be disassociated. The ST nexus 128 then sends a message (S406) to the pool DB 130 to return the allocated PSTN number to the pool, and the PSTN number is placed in the pool in a position depending on the factors listed previously. This is acknowledged in step S408. The ST nexus 128 also instructs (in step S410) the switch DB 132 to remove the association information for these endpoints, which is acknowledged in step S412. The disassociation is reported to the platform 124 via the SOAP GW 126 in steps S414 and S416.

A similar operation to that shown in FIG. 4 is performed when disassociating an association ID that can be incorporated into a callto link. The only difference is that the number does not need to be returned to a pool, so steps S406 and S408 are not required.

A back-office ("BO") interface 152 is provided to both the pool DB 130 and the switch DB 132 in order to enable the monitoring and management of the PSTN number pools.

When one of the above types of association are in place, then the buyer can initiate contact with the seller according to the flowchart shown in FIG. 2. The contact from the buyer is initiated from the associated information, and the system must therefore route the call to the correct endpoint.

If the contact is to be made via a voice call (as opposed to an IM chat—S204 in FIG. 2), then there are four cases to consider—where the buyer initiates a call from a PSTN terminal and the seller's endpoint is a PSTN terminal; where the where the buyer initiates a call from a PSTN terminal and the seller's endpoint is VoIP (client or voicemail); where the buyer initiates a call from a VoIP client and the seller's endpoint is a PSTN terminal; and where the buyer initiates a call from a VoIP client and the seller's endpoint is VoIP (client or voicemail). Each of these is considered in turn below.

The first case considered is where the buyer is initiating a voice call from a PSTN terminal and the endpoint is a PSTN terminal (although the buyer does not know this). This process is illustrated with reference to FIG. 5. The buyer dials the PSTN number allocated to the seller and shown on the website (shown as S210 in FIG. 2). The call is routed from the PSTN terminal 114, over the PSTN network 104 to the session initiation protocol in ("SIP IN") gateway 134. The SIP IN gateway 134 provides the voice call connection into the system from the PSTN network 104.

If the PSTN number shown on the website and dialled by the buyer is a toll-free number with an extension, then in S502 the buyer is connected to an interactive voice response ("IVR") service 136. This is an automated service that prompts the buyer (in his desired language) to enter the extension displayed on the webpage.

Figure 6:
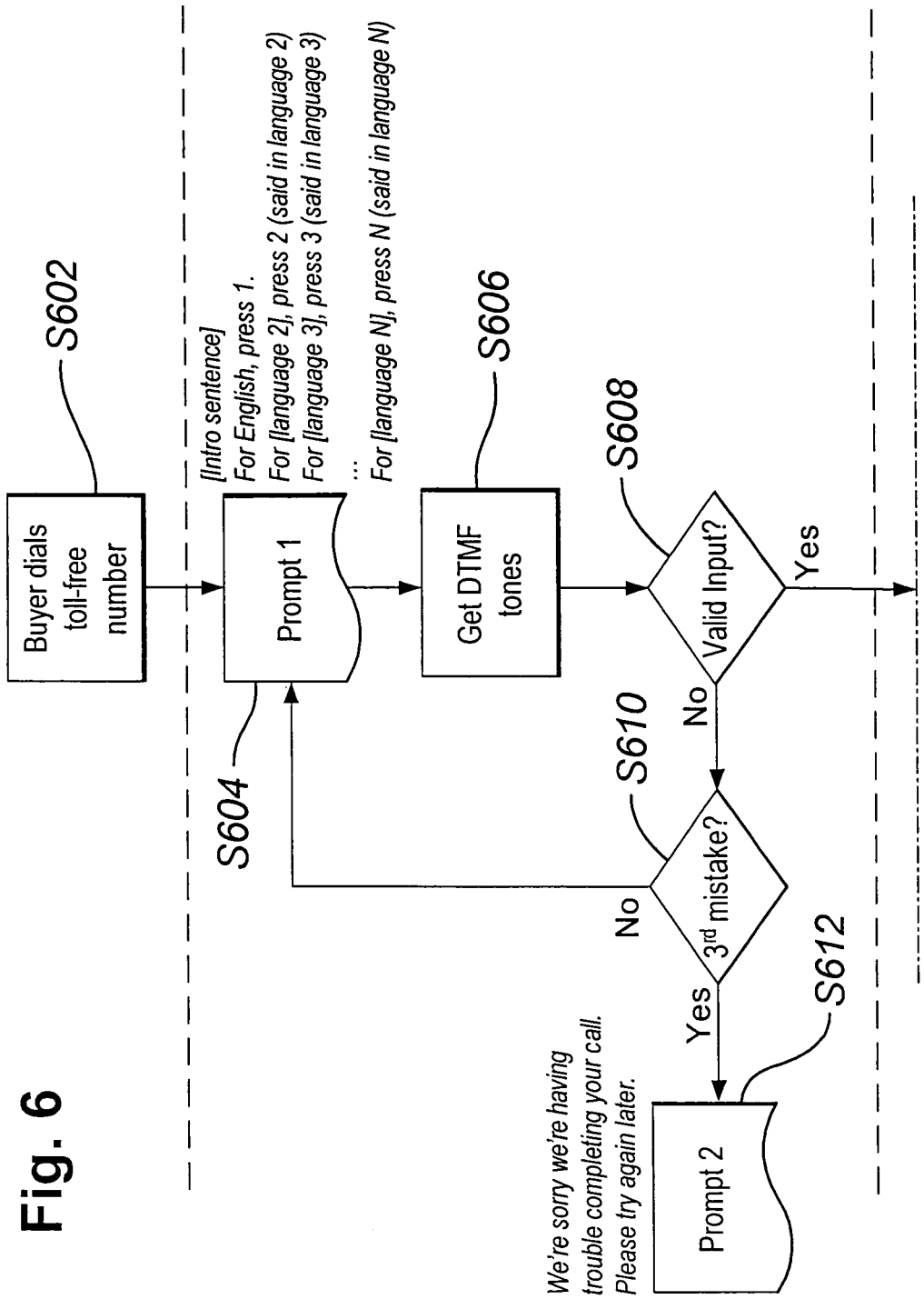
FIG. 6 shows a flowchart for the operation of an interactive voice response service.

A flowchart of the operation of an example IVR is shown in FIG. 6. Note that in alternative embodiments, different steps, prompts and retry parameters could also be used. In step S602, the buyer has dialled a toll-free PSTN number that requires an extension to be entered. In step S604 the buyer is prompted with an audio message to enter his language requirements. The buyer must use the PSTN terminal keypad to enter a selection in S606. In S608, it is checked whether a valid input was entered. If not, in step S610, the user is returned to S604 if less than three mistakes have been made. If three mistakes have been made, then in step S612 the buyer is presented with an error message and the call terminates.

If a valid input was entered in step S608, then in step S614 the buyer is prompted with an audio message requesting him to enter the extension number provided on the webpage. The buyer enters this extension using the PSTN terminal keypad in step S616. In step S618, it is checked whether the extension number is valid. If it is determined that the extension is not valid then in step S620 it is checked whether less than three invalid extensions have been entered. If less than three invalid extensions have been entered, then in step S622, the buyer is prompted to re-enter the extension, and returned to step S614. If three invalid extensions have been entered, then in step S624 the buyer is prompted with an error message informing him that the call cannot be completed, and in step S626 the call is terminated. If in step S618 it is determined that the extension is valid, then in step S628 the call connection process can continue.

Obviously, if no extension is required, then the process of interaction with the IVR 136 is not required.

Referring again to FIG. 5, the interaction with the IVR 136 is shown in step S504, where the buyer is prompted to enter the extension, and in step S506, where the extension is provided to the IVR 136. When the correct extension for the seller has been entered in the IVR 136 (or if no extension is required), a message containing the PSTN number dialled and the extension is passed to the SIP IN gateway 134 in step S508. The SIP IN gateway 134 then transmits a message containing this information to the ST nexus 128 in step S510, to receive the contact information for the endpoint of the seller to be contacted.

The ST nexus 128 must determine the endpoint to which the call from the buyer should be routed. The first step in this is to resolve the identity used by the buyer (e.g. the PSTN toll-free number+extension) into the personal contact details for the seller. This is achieved by the ST nexus 128 sending a message containing the identity to the switch DB 132 in step S512, which returns the endpoints of the seller associated with the identity and the related parameters about these endpoints in step S514.

Once the ST Nexus has determined which endpoints the seller can be contacted on (as in steps S212A-C in FIG. 2), the ST nexus 128 then performs the next stage of endpoint selection. The selection is based upon the parameters entered by the seller for the endpoints. In particular, any restriction on the time during which a particular endpoint can be called is used to determine which endpoints are eligible to be called (as in steps S216A-C in FIG. 2). In many cases, the selection at this point is simple, as the seller will often only define one endpoint to be available at any one time (e.g. a PSTN endpoint during office hours, and voicemail at all other times). However, it is also possible that there is a choice of eligible endpoints available. In this instance, the ST Nexus 128 selects all the eligible endpoints. This causes the call to be connected to all the eligible endpoints simultaneously, thereby causing them all to ring, and the buyer will be connected to the endpoint that is answered first.

Once an endpoint has been selected (or multiple endpoints selected), this is communicated to the SIP IN gateway 134 in step S516. The ST nexus also needs to determine event tracking requirements for the type of source and endpoint being connected. Event tracking is desirable in order to monitor the duration of the calls, and also any errors that occur. The events for a call make up a lead data record ("LDR") for each call made to a seller. This can be used to charge the seller for sales leads that he receives from potential buyers, in return for the provision of a toll-free (or local) PSTN number. In particular, calls from a PSTN source or to a PSTN endpoint may only need to track the start and end of the call. However, calls from VoIP to VoIP may require the tracking of the call start, the call end, and also periodic tracking of the call over its duration (known as call tick events). The tracking requirements are determined in step S518, and communicated to the SIP IN gateway in step S520. The use of this system permits new endpoints and events to be added, and the ST Nexus 128 can be provided with intelligence to optimise the circumstances in which events should be generated.

The call is then connected from the SIP IN gateway 134 to the endpoint 102 selected by the ST nexus 128. In the case of a PSTN source 114 and a PSTN endpoint 102 as shown in FIG. 5, the call is routed from the SIP IN gateway 134 to the SIP OUT gateway 138 (S522), across the PSTN network 104 to the PSTN endpoint 102 (S524) and the PSTN source 114 (S526). When the buyer is connected to the seller, the anonymity requirements remain—i.e. the seller cannot see the buyer's contact details (i.e. the buyer's PSTN telephone number) and the buyer cannot see the seller's PSTN telephone number.

The SIP IN and/or SIP OUT gateways (134, 138) perform event tracking, and report the results to an event transport queue 140. Various types of event can be tracked and recorded (depending on the tracking requirements determined for the endpoints), such as call start events, call tick events, call end events, IVR start events, IVR end events, error events, and, in the case of IM chats, chat sent and chat received events.

The events are communicated to and stored in the event transport queue 140, as illustrated in step S528 in FIG. 5, and from here an event stream can be provided to the platform, where it may be dealt with as the platform sees fit. For example, it may be logged by an event logger node 142, and stored in an LDR DB 144.

The second case is now considered where the buyer is initiating a voice call from a PSTN terminal and the endpoint is a VoIP endpoint, either the VoIP client 106 or VoIP voicemail 122 (although the buyer does not know this). This process is illustrated with reference to FIG. 7. The first six steps (S702-S712) are identical to the first six steps described above with reference to FIG. 5. The endpoints returned to the ST nexus 128 in step S714 are such that the ST nexus 128 selects the appropriate endpoint to be a VoIP endpoint (either the VoIP client 106 or the VoIP voicemail 122). The VoIP endpoint is returned to the SIP IN gateway 134 in step S716. The tracking requirements for the PSTN source and VoIP endpoint are derived in S718, and reported to the SIP IN GW 134 in step S720. In step S722, the connection to the VoIP endpoint is established from the SIP IN gateway 134 to the P2P network 112, and to either the VoIP client 106 running on PC 108, or to the VoIP voicemail server 122, and to the PSTN source 114 in step S724. The SIP IN GW 134 reports the events to the event transport queue 140 in step S726.

The anonymity requirements also apply to this case—i.e. the seller cannot see the buyer's PSTN telephone number in the VoIP client window and the buyer cannot see the seller's VoIP ID. However, the seller may be provided with some contextual information when the call is first established (e.g. when it is ringing) in order to allow the seller to decide whether to answer the call. This contextual information can include details about the product about which the buyer is calling, or an auction ID, for example.

The third case is now considered where the buyer initiates a call from a VoIP client and the seller's endpoint is a PSTN terminal. This process is illustrated with reference to FIG. 8. In step S802 the VoIP call from the buyer is initiated by clicking on a callto link or button on a webpage. There is no need for an IVR in this case, as the association ID embedded in the callto link does not require an extension. The call set up message containing the association ID is received at the SIP OUT gateway 138. The SIP OUT GW 138 then requests the endpoint associated with the association ID from the ST nexus 128 in step S814. The endpoints are requested (S806) and obtained (S808) from the switch DB 132 by the ST nexus 128. The ST nexus then performs the endpoint selection as described previously, and in this case selects the PSTN endpoint 102. This selection is reported to the SIP OUT GW 138 in step S810. The tracking requirements are determined (S812) and reported (S814) to the SIP OUT GW 138. A connection is then created between the SIP OUT gateway 138 and the PSTN endpoint 102 in step S816, and between the SIP OUT gateway 138 and the VoIP source 116 in step S818. The events are reported to the event transport 140 in step S820. As with the previous cases, the anonymity requirements remain here too. The seller cannot see the buyer's VoIP ID and the buyer cannot see the seller's PSTN telephone number.

The fourth case is now considered where the buyer initiates a call from a VoIP client and the seller's endpoint is a VoIP endpoint (either VoIP client or VoIP voicemail). This process is illustrated with reference to FIG. 9. In step S902 the VoIP client 116 contacts a PPLp2pGW node 150. The PPLp2pGW 150 acts as an interface between the P2P network 112 and the ST Nexus 128. In step S904, the PPLp2pGW 150 requests the endpoints from the ST Nexus 128. The endpoints are resolved by the ST Nexus 128 in step S906. The endpoints returned by the switch DB in S908 are such that the ST nexus 128 selects the endpoint to contact to be a VoIP endpoint (client 106 or voicemail 122). This is communicated to the PPLp2pGW 150 in step S910. The tracking requirements are determined (S912) and reported (S914) to the PPLp2pGW 150. The endpoint to contact are reported from the PPLp2pGW 150 to the VoIP client 116 in step S916. A connection is then established from the VoIP client 116, over the P2P network 112, to either the VoIP client 106 running on PC 108, or to the VoIP voicemail server 122 (S918). The events are reported to the event transport 140 in step S920.

The anonymity requirements also apply to the fourth case—i.e. the seller cannot view the buyer's VoIP contact details in the sellers VoIP client and the buyer cannot see the seller's VoIP ID. The seller can, however, be provided with contextual information when the call is first established (e.g. when it is ringing) in order to allow the seller to decide whether to answer the call. This contextual information can include details about the product about which the buyer is calling, or an auction ID, for example.

The above four cases therefore describe the establishment of calls for the different combinations of sources and endpoints, and the recording of the appropriate events.

When a call ends, and the associated event is reported, this permits a lead data record to be produced for the call. The lead data record combines all the event information recorded for the call. This can be reported to the platform billing node 146, which can use the information to determine whether to charge the seller for the call. The presence of call start and call end events permits the duration of the call to be calculated. This may be useful in determining whether the call made to the seller was a useful "lead", i.e. whether it was a genuine potential buyer, and hence whether the seller should be charged.

Referring again to FIG. 1, a pool orderer node 148 is shown connected to the event transport queue. The pool orderer node 148 monitors the events in the queue, and updates the information stored against the PSTN numbers stored in the pool DB 130, so that the pool DB 130 accurately records the statistics (e.g., as outlined previously, the number of calls made to each PSTN number etc.) for each PSTN number, thereby allowing the PSTN numbers to be ordered according to their "dirtiness".

As mentioned previously, in addition to contacting a seller using a voice call, a buyer may also have the option of contacting a seller using an IM chat. This was illustrated by the option in step S204 of FIG. 2. An IM chat session with a seller is established in the same way as a VoIP call to the seller, in that a link is clicked on a webpage (this is known as a "chatto:" link instead of a "callto:" link), and the link has embedded within it a randomly assigned association ID (generated using the same process as described previously with reference to VoIP association IDs). There is no selection of endpoints required for IM chats, so the ST nexus 128 only needs to resolve the association ID to the IM contact details of the seller. The IM connection can then be set up between the buyer and the seller, if the seller is available to receive IM chat messages. The anonymity requirements are the same for IM as for voice calls—i.e. the buyer's identity is not revealed to the seller in the IM chat client, and vice versa. However, some information regarding the source is provided to the seller (e.g. the identity of the items about which the buyer is enquiring or an auction ID) in order to allow the seller to decide whether to accept the connection.

Events are also tracked for IM chat sessions, as well as voice calls. For example, an event can be generated and recorded for every message sent and received in the IM session. These chat message events are transmitted to the event transport queue 140 and may be utilised by the platform as described previously.

The above-described system therefore provides a technique for enabling communication to be established between parties that do not know each other's contact details, and do not want their contact details to be publicly disclosed. This is of particular use for enabling contact from webpages published on the Internet. The Internet provides a readily accessible way for people to provide information that can be viewed by a potentially very large audience. As a result of this, websites have become popular that allow users to advertise goods for sale, such as auction websites. However, the information provided on these websites may not always be sufficient for a potential buyer, and the potential buyer frequently wants to be able to contact the seller of the goods directly using interactive communication (such as a voice call), rather than relying on non-interactive communication, such as email. Furthermore, the seller may want the buyer to be able to contact them without the buyer having to pay money (in order to maximise potential sales).

Without the use of a system such as that described above, the seller would need to publish his telephone number or VoIP ID directly on the website, in order to allow him to be contacted by potential buyers. However, this has significant disadvantages. For a published telephone number, this is not free for the buyer to call (unless the seller has paid for a toll-free number, which can be expensive) and the publication of the personal telephone number of the seller may lead to misuse of the telephone number—for example through unsolicited calls. For a published VoIP or IM contact ID this also has the disadvantage that the seller's VoIP or IM contact identity is publicly available and can be misused. Furthermore, it is also in the interests of the operator of the website to constrain the parties (i.e. a buyer and a seller) to communicating via the website. This can help to avoid the parties reaching a potential deal away from the operator and attempting to avoid any fees for offering the item on the website.

The above-described system therefore provides a technique to address these problems by enabling of interactive communication to a user who wishes to be contactable via a website without disclosing personal information.

While this invention has been particularly shown and described with references to example embodiments thereof, it will be understood by those skilled in the art that various changes in form and details may be made therein without departing from the scope of the invention encompassed by the appended claims.

What is claimed is:

1. A method of establishing communication between a first and second user over a communications network, said second user being associated with contact information for a plurality of destination nodes, the method comprising:
   allocating to the contact information for the plurality of destination nodes an identity from a set of available identities by randomly selecting the identity from the set of available identities;
   displaying hyperlinks including said identity on a display and as part of a web resource, wherein each of the hyperlinks is associated with a different destination node type for the plurality of destination nodes and does not include the contact information for a respective one of the destination nodes;
   receiving an indication of a selection of one of said hyperlinks;
   responsive to receiving said indication, transmitting from a client associated with the first user, a message to initiate communication with at least one of the destination nodes that corresponds to a selected one of the hyperlinks, said message comprising said identity and said identity being configured to be translated by a network resource to contact information for the at least one destination node to enable initiation of said communication;
   monitoring a connection with the at least one destination node over the communications network; and
   reporting one or more events related to the connection to an operator of the web resource, the one or more events including at least one of a call start event, a call end event, an error event, an instant messaging sent event, or an instant messaging received event.

2. A method according to claim 1, wherein the contact information comprises at least one of a telephone number, a VoIP identity and an instant messaging identity.

3. A method according to claim 1, wherein the different destination node types comprise two or more of a public switched telephone network terminal, a VoIP client, a voice-mail server, and an instant messaging client.

4. A method according to claim 1, wherein the communication between the first and second user is a voice call.

5. A method according to claim 1, wherein the communication between the first and second user is an instant messaging conversation.

6. A method according to claim 1, wherein said display is a website.

7. A method according to claim 1, further comprising selecting the at least one destination node by comparing a current time with time ranges defined for each of the plurality of destination nodes, such that only those destination nodes with time ranges encompassing the current time are selected.

8. A method according to claim 7, wherein, in the case that more than one destination node is selected, establishing the connection with all the selected destination nodes, such that the client is connected to the destination node answered first, and the connection to the remaining selected destination nodes is discontinued.

9. A method according to claim 1, wherein said indication is received in response to a user clicking on said hyperlink.

10. A method according to claim 1, wherein said identity is configured to be translated invisibly to a user associated with the client.

11. A method of establishing communication between a first and second user, said second user being associated with contact information for a plurality of destination nodes, the method comprising:
   allocating to the contact information for the plurality of destination nodes an identity from a set of available identities, the destination nodes including a plurality of destination node types including a voice over Internet Protocol (VoIP) client and an instant messaging client and said allocating including randomly selecting the identity from the set of available identities;
   providing said identity to said first user whilst withholding the contact information from the first user, said providing comprising causing hyperlinks associated with the plurality of destination node types to be displayed;
   transmitting a message to initiate communication comprising the identity from a user terminal of said first user, said transmitting occurring in response to a selection of one of the hyperlinks, and said identity being configured to be translated to said contact information to enable communication between the user terminal and at least one of the destination nodes associated with one of the destination node types that corresponds to the selected one of the hyperlinks;
   monitoring a connection with the at least one destination node over the communications network; and
   reporting one or more events related to the connection, the one or more events including at least one of a call start event, a call end event, an error event, an instant messaging sent event, or an instant messaging received event.

12. A method according to claim 11, wherein said providing comprises displaying a hyperlink including said identity on a display, wherein said hyperlink does not include the contact information of the second user, and said selection of said one of the destination node types comprises a selection of said hyperlink.

13. A method according to claim 11, wherein providing comprises displaying said identity on a display, wherein said identity does not relate to the contact information of the second user, said first user viewing said display using a terminal connected to the communications network and dialing said identity using a communications terminal.

14. A system for establishing communication between a first and second user over a communications network, said second user being associated with contact information for a plurality of destination nodes, the system comprising:
means for allocating to the contact information for plurality of destination nodes an identity from a set of available identities, the destination nodes including a plurality of different destination node types and said allocating including randomly selecting the identity from the set of available identities;
means for providing said identity to said first user whilst withholding the contact information from the first user, said providing comprising causing hyperlinks associated with the plurality of destination node types to be displayed;
user terminal means, operable by said first user, for transmitting a message to initiate communication comprising the identity, said user terminal means being configured to transmit the message in response to a selection of one of the hyperlinks, and said identity being configured to be translated to said contact information to enable communication between the user terminal means and at least one of the destination nodes associated with one of the destination node types that corresponds to the selected one of the hyperlinks;
means for monitoring a connection with the at least one destination node; and
means for reporting one or more events related to the connection, the one or more events including at least one of a call start event, a call end event, an error event, an instant messaging sent event, or an instant messaging received event.

15. A system comprising:
means for allocating an identity to contact information for a plurality of destination nodes by randomly selecting the identity from a set of available identities;
means for displaying hyperlinks including said identity on a display and as part of a website, wherein each of the hyperlinks is associated with a different destination node type for the plurality of destination nodes and does not include the contact information for a respective one of the destination nodes;
means for receiving an indication of a selection of one of said hyperlinks;
means for, responsive to receiving said indication, transmitting from a client associated with a user, a message to initiate communication with at least one of the destination nodes that corresponds to a selected one of the hyperlinks, said message comprising said identity and said identity being configured to be translated by a network resource to contact information for the at least one destination node to enable initiation of said communication;
means for monitoring a connection with the at least one destination node over the communications network; and
means for reporting one or more events related to the connection to an operator of the website, the one or more events including at least one of a call start event, a call end event, an error event, an instant messaging sent event, or an instant messaging received event.

16. A method comprising:
allocating an identity to contact information for a plurality of destination nodes by randomly selecting the identity from a set of available identities;
causing hyperlinks that include the identity to be displayed as part of a website, wherein individual of the hyperlinks are associated with different destination node types for the plurality of destination nodes and do not include the contact information for the destination nodes;
responsive to receiving an indication of a selection of one of the hyperlinks, transmitting from a client associated with a user a message to initiate communication with at least one of the destination nodes that corresponds to a selected one of the hyperlinks, the message comprising the identity and the identity being configured to be translated by a network resource to contact information for the at least one destination node to enable initiation of said communication;
monitoring a connection with the at least one destination node over the communications network; and
reporting one or more events related to the connection to an operator of the website, the one or more events including at least one of a call start event, a call end event, an error event, an instant messaging sent event, or an instant messaging received event.

17. A method as recited in claim 16, wherein at least some of the destination nodes are individually associated with different endpoint types.

18. A method as recited in claim 16, wherein the contact information comprises at least one of a telephone number, a VoIP identity, or an instant messaging identity.

19. A method as recited in claim 16, further comprising selecting the at least one destination node by comparing a current time with time ranges defined for each of the plurality of destination nodes, such that only those destination nodes with time ranges encompassing the current time are selected.

20. A method as recited in claim 16, wherein the identity is further configured to be translated by the network resource into contact information for multiple of destination nodes.

* * * * *